(No Model.)
K. WITZ.
MANUFACTURE OF PLASTIC ARTICLES.
No. 520,283. Patented May 22, 1894.
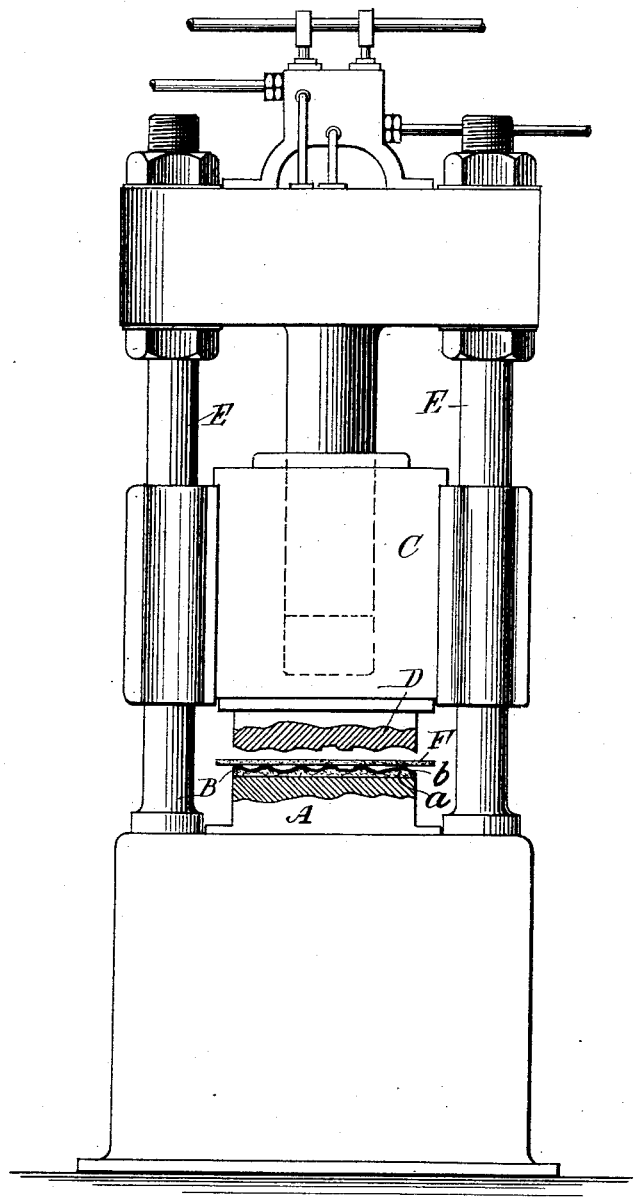

UNITED STATES PATENT OFFICE.

KONRAD WITZ, OF HOBOKEN, ASSIGNOR TO HIMSELF, AND FRANK GRAUS OF JERSEY CITY, NEW JERSEY.

MANUFACTURE OF PLASTIC ARTICLES.

SPECIFICATION forming part of Letters Patent No. 520,283, dated May 22, 1894.

Application filed January 16, 1894. Serial No. 497,104. (No specimens.)

*To all whom it may concern:*

Be it known that I, KONRAD WITZ, of Hoboken, in the county of Hudson and State of New Jersey, have invented certain new and useful Improvements in the Manufacture of Plastic Articles, of which the following is a full, clear, and exact description, reference being had to the accompanying drawing, which is an elevation, with parts in section, of a press such as may be employed for carrying out my invention.

My invention relates to the manufacture of plastic articles which are formed by pressing a suitable mass between a stamp and a matrix, and more particularly to the manufacture of plastic pictures or designs made of pressed paper board.

The object of the invention is to enable the manufacturer to produce very strong and durable plastic articles of the above mentioned kind, by one operation of the press even in cases where the height of the raised portions of the article exceeds the maximum height that can be produced in the same manner, i. e., by one operation of the press according to the processes now in use.

A further object of the invention is to prevent the surface of the paper board from being cut by sharp edges of the matrix, so as to avoid cracks in the finished article.

To these ends, my invention consists essentially in a particular construction of the matrix, and a special preparation of the mass which it is intended to subject to pressure.

The invention will be fully disclosed hereinafter, and the features of novelty pointed out in the claims.

In carrying out my invention, I employ any one of the usual presses in which the heated patrix or stamp and the matrix are capable of moving toward and from each other. Instead of the usual essentially rigid matrix, however, I provide a matrix having an elastic bark surface, so that the matrix will be capable of yielding to a greater extent than the patrix, which is practically rigid.

In the accompanying drawing, I have shown a hydraulic press of the ordinary construction, provided with the bed or support A, on which is placed the matrix B, and with the plunger block C, carrying the patrix D and having guided movement along uprights E.

The construction of my improved matrix is as follows: The matrix consists of a plastic supporting or bottom layer $a$, and a top or surface layer $b$, of birch bark. The supporting layer $a$, is composed of rye flour, paper pulp, and siccative, and forms a sticky paste which is pressed into the required shape by means of the patrix. The bark is first made smooth, and boiled in vinegar in order to remove grease and other injurious substances. Thereafter, the bark is impregnated with hellebore juice whereby it is given elasticity and tenacity, rendering it similar to leather. The juice of hellebore also makes the bark water-tight so that no varnish need be applied on its surface. When the bark has been prepared as above described it is placed on the molded layer of flour, &c., which has become hard, and the heated stamp is brought in contact with the bark to press it into the required shape. The stamp or patrix is kept pressed against the matrix until the bark has become perfectly dry and hard. The matrix is then ready for use.

The paper board, papier maché, or equivalent substance of which the articles are to be formed by pressure, is moistened or impregnated on its surface with the above mentioned hellebore juice diluted by about ten times its amount of water. In case the material itself is moist, the proportion of water may be reduced. The material which I prefer to employ is uncalendered paper board. The juice of hellebore is allowed to penetrate the material to a certain extent before the said material is placed in the press. This liquid will render the paper board elastic so that it will yield to pressure, yet sufficiently tough to prevent its surface from being cut or otherwise injured by sharp lines on the matrix.

When a layer of paper board or equivalent material F, prepared as above described, is placed between the patrix D, and the matrix B, and subjected to pressure, the patrix which presses against what will be the back of the finished article, will perform its usual function. The matrix, however, will yield somewhat, owing to the elasticity of the prepared bark surface so that the pressure will be reduced at first; on the other hand the plastic material will also yield, and in consequence thereof the pattern or design produced on the matrix will be gradually reproduced on the adjacent surface of the paper, without any such strain as might cause sharp lines of the matrix to cut or tear the surface of the plastic material.

Owing to the employment of an elastic matrix of the construction described, I may use a considerably higher pressure than when a matrix of the usual construction is employed, and thus I may produce, by one operation of the press, plastic articles having projections of greater height than could be satisfactorily obtained with presses having an ordinary comparatively rigid matrix.

In order to conveniently color the pressed surface of the article, I prefer to make a series of patterns by pressing plates of a suitable material, such as celluloid, between the patrix and matrix, so that the surface of the plates will conform to that of the article, and then producing the usual openings in the plates to allow the colors to be applied. Such pressed patterns may be employed for coloring any article that has a raised or depressed surface, and particularly articles whose surface is formed in relief, or with recesses. The finished article, owing to its being impregnated with hellebore juice, is very strong and durable.

I desire it to be understood that I do not confine myself to the use of the specific substances named in the above description, but it will be obvious that equivalents may be used without departing from the spirit of my invention. It is, however, believed that the above enumerated ingredients and materials are superior to others for the purposes of my invention.

What I claim, and desire to secure by Letters Patent, is—

1. The herein described improvement in the manufacture of pressed plastic articles, which consists in impregnating the material with hellebore juice to increase its elasticity and tenacity, and then pressing the said material between a patrix and a matrix, the latter being more elastic than the patrix, substantially as described.

2. The process of preparing paper board or other material prior to subjecting it to pressure, which consists in impregnating it with hellebore juice, substantially as described.

3. An elastic matrix for the purpose described, comprising a suitable plastic bottom layer, and a surface layer made of bark, substantially as set forth.

4. An elastic matrix for the purpose described, comprising a bottom layer of rye flour and paper bound by siccative, and a surface layer of birch bark, substantially as set forth.

KONRAD WITZ.

Witnesses:
JNO. M. RITTER,
JOHN LOTKA.